UNITED STATES PATENT OFFICE 2,060,223

PROCESS OF GROWING MUSHROOMS

Edmund B. Lambert and Harry Humfeld,
Clarendon, Va.

No Drawing. Application June 30, 1936,
Serial No. 88,117

9 Claims. (Cl. 47—58)

(Granted under the act of March 3, 1883, as
amended April 30, 1928; 370 O. G. 757)

This application is made under the act of March 3, 1883, as amended by the act of April 30, 1928, and the invention herein described and claimed may be manufactured and used by or for the Government for governmental purposes without the payment to us of any royalty thereon.

We hereby dedicate the invention herein described to the free use of the people of the United States, to take effect on the granting of a patent to us.

Our invention comprises a process of growing mushrooms and the production of an intermediary product for the growing of mushrooms.

Generally, mushrooms are grown by a process comprising the following steps: (1) Organic matter consisting of horse manure or a suitable substitute is assembled into piles and fermented for a period of 3 weeks to 2 months; (2) the resulting "compost" is taken into a mushroom house, abandoned building, cave, mine, or other suitable place and made up into beds about 6 inches deep either on shelves or on the floor; (3) where the conditions permit, the temperature is raised around the beds and a suitable fumigant used, such as cyanide gas, sulphur dioxide gas, or formaldehyde; (4) the temperature in and around the beds is lowered, and "spawn" is placed in the beds; (5) the root-like growth, or "mycelium" is allowed to spread from the spawn in the beds for about 2 weeks; (6) the beds are covered with a layer of soil about 1 inch thick; (7) conditions are maintained in and about the beds suitable for the growth of mushrooms which are picked and marketed as they develop. In growing mushrooms heretofore, as outlined in U. S. D. A. circular #251, steps (2), (3), (4), (5), (6), and (7) have been carried out in the same zone of operation with the exception of one grower (see Patent No. 2,034,678) who segregates steps (6) and (7) from the foregoing steps.

Our present invention proposes to make it easier to maintain proper conditions for the effective control of fungus and insect pests in step (3) by carrying out the operations necessary during step (3) in one zone of operations or combining steps (1), (2), and (3) in one zone, then transporting the resulting compost to another zone of operations for steps (4), (5), (6), and (7).

A detailed explanation of step (3) and a few practical examples will serve to show the need for the improved process herein described and some of its advantages over the present practice.

As pointed out in Circular 251 of the U. S. Department of Agriculture, the conditions which must be maintained during step (3) are the most difficult and exacting of all of the phases of mushroom culture. Poor crops are frequently due to a failure to attain optimum conditions during this step. The object of this step is to eliminate harmful insects and fungus pests from the compost while at the same time maintaining a condition within the compost favorable to the growth of the mushroom mycelium under conditions of biological competition. For several hours during this period the air temperature surrounding the beds should be maintained above 110° F. (preferably 130° F. to 135° F.) and the temperature within the compost of the beds should be held at the 130° F. to 145° F. If the air temperature and compost temperature are not raised sufficiently the pests are not killed. On the other hand, if the temperature within the compost is raised much above 145° F., a condition is brought about in the compost which makes it more difficult for the mushroom mycelium to compete with other fungi for nutrients in the compost. This results in a poor crop of mushrooms. Near the end of step (3) is usually the most favorable time to release a gas fumigant into the atmosphere surrounding the compost, because at this time the higher temperature within the compost has driven the insects to the surface of the compost. To obtain a high concentration of fumigant a comparatively tight room is necessary.

It is clear that for effective eradication of pests in step (3) a rigid control of several conditions must be maintained. In the average mushroom house these conditions are rarely attained and in locations where old buildings or abandoned mines or caves are used, proper conditions for the elimination of pests are not even approximated.

The present inventors have found that these conditions can be obtained more easily, with greater certainty, and in many cases more cheaply if a special room is equipped for step (3) separate from the zone or area used for steps (4), (5), (6), and (7). Our new process is especially advantageous to growers who are producing mushrooms in abandoned caves or mines, since under the systems heretofore practiced they are unable to eradicate pests from the compost. Using our process this end is attained by constructing, at or near the entrance of the cave, a room fitted with proper source of heat and thermostatic and humidostatic control for maintaining the desired conditions during step (3). The compost is heated and fumigated in this room, and, when free of pests, transported into the cave where it is made into beds, spawned, covered with soil, and allowed to produce a crop of mushrooms. Since the filling, heating and fumigating process involved in steps (2) and (3) take less than a week, the processing room serves to treat 4 or 5 times as much compost in our process in a given length of time, as under the system outlined in the prior art, thereby making our method of producing mushrooms more economical.

Another illustration of the practical advantage of our invention is the case in which a processing room is maintained near the source of the manure or the place where it is unloaded from railroad cars. In such a case steps (1), (2), and (3) are carried out in the location and with equipment best suited for this purpose. Following this the compost is transported to suitable houses for growing mushrooms, or sold to growers having suitable facilities for growing mushrooms. Using this system, one processing room can easily serve 30 or 40 standard growing houses.

Specific description has been omitted of the type of shelves, or containers in which the compost is handled during the processing and transportation, of the compost because it is felt that there is little new and useful to be added in that direction.

Proper conditions can be attained for eradicating pests either in movable containers, or on shelf beds as is common practice in standard houses. Both methods have been tried and found satisfactory in actual practice. To assure aeration and avoid overheating, the manure, as a rule is piled in these containers in the beds to a depth of from 6 inches to 18 inches and provision is made for proper ventilation from the bottom.

In the foregoing explanation and in the annexed claims the term "organic matter" refers to horse manure or any equivalent material capable of being rendered suitable for the development of rootlike growth from "spawn" called "mycelium" and for the subsequent development of mushrooms as outlined in the aforesaid steps (4), (5), (6), and (7). The term "spawn" is used either as a noun or a verb in the sense common to the commercial mushroom trade.

Having thus described our invention, what we claim for Letters Patent is:

1. In the process of growing mushrooms, the steps which comprise placing organic matter in a zone suitable for the control of fungus and insects pests, thence removing said organic matter before it is spawned.

2. In the process of growing mushrooms, the steps which comprise placing organic matter in a zone suitable for fermenting said organic matter, the while eliminating fungus or insect pests therefrom, thence removing said organic matter before it is spawned.

3. In the process of growing mushrooms, the steps which comprise placing organic matter in a zone suitable for the control of fungus and insect pests, thence removing said organic matter before it is spawned, and thence transporting said organic matter to a separate zone suitable for development of mushroom mycelium and mushrooms.

4. In the process of growing mushrooms, the steps which comprise placing organic matter in a zone in which the air temperature is raised above 110° F., thence removing said organic matter before it is spawned.

5. In the process of growing mushrooms, the steps which comprise placing organic matter in a zone in which the air temperature is raised above 110° F., thence transporting said organic matter to a separate zone suitable for raising mushroom mycelium and mushrooms.

6. In the process of growing mushrooms, the steps which comprise placing organic matter in a zone in which the air temperature is raised above 110° F., thence releasing insecticidal and fungicidal gas to a lethal concentration within said zone, and thence removing said organic matter before it is spawned.

7. In the process of growing mushrooms, the steps which comprise placing organic matter in a zone in which the air temperature is raised above 110° F., thence transporting said organic matter to a separate zone in which the air temperature may be maintained between 40° F. and 80° F.

8. In the process of growing mushrooms, the steps which comprise placing organic matter in a zone in which the air temperature is raised above 110° F., thence releasing insecticidal and fungicidal gas to a lethal concentration within said zone, thence transporting said organic matter to a separate zone in which the air temperature may be maintained between 40° F. and 80° F.

9. In the process of growing mushrooms, the steps which comprise placing organic matter in a zone in which the air temperature is maintained up to about 135° F. and the manure temperature maintained up to about 145° F., thence releasing insecticidal and fungicidal gas to a lethal concentration within said zone, and thence transporting said organic matter to a separate zone in which the air temperature may be maintained between 40° F. and 80° F.

EDMUND B. LAMBERT.
HARRY HUMFELD.